F. TURK.
WATERING TROUGH.
APPLICATION FILED MAY 13, 1919.
1,414,532.
Patented May 2, 1922.
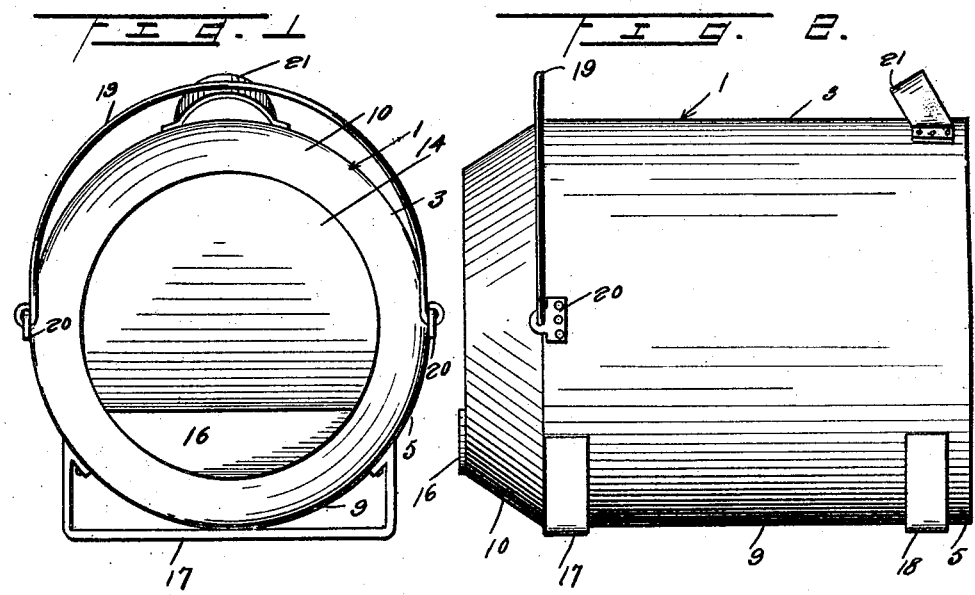
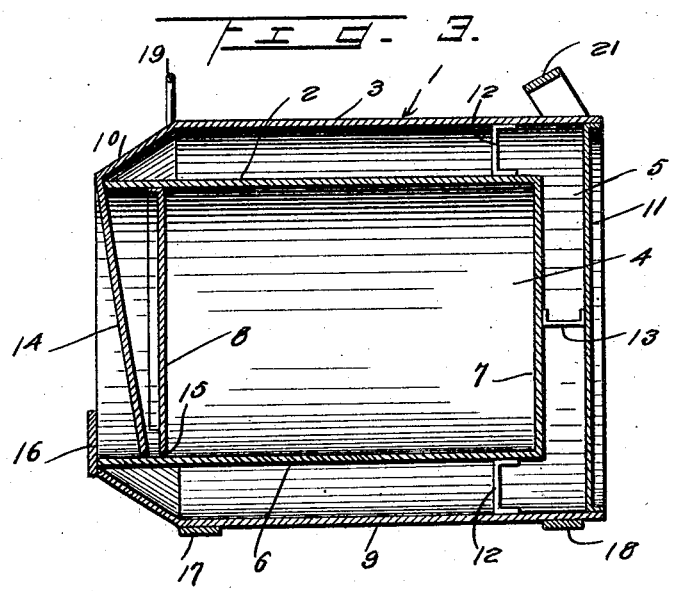
Inventor
F. Turk.

UNITED STATES PATENT OFFICE.

FRANK TURK, OF PIPESTONE, MINNESOTA.

WATERING TROUGH.

1,414,532.  Specification of Letters Patent.  Patented May 2, 1922.

Application filed May 13, 1919. Serial No. 296,847.

*To all whom it may concern:*

Be it known that I, FRANK TURK, a citizen of the United States, residing at Pipestone, in the county of Pipestone and State of Minnesota, have invented certain new and useful Improvements in Watering Troughs; and I do hereby declare the following to be a full, clear, and exact description of the invention, such as will enable others skilled in the art to which it appertains to make and use the same.

This invention relates to watering troughs for fowls and the like, and the primary object of the invention is to provide an improved sanitary non-freezing watering tank, which is so constructed as to have means carried by the tank for heating the water.

Another object of the invention is to provide an improved watering trough in which hot water is adapted to be placed in the tank, the tank being so constructed as to prevent the rapid cooling thereof.

A further object of the invention is to provide a watering tank having means for allowing a small portion of the water to be exposed to the atmosphere so that the same may be moved, when the animals or fowls drink the same.

With these and other objects in view, the invention consists in the novel construction, arrangement and formation of parts, as will be hereinafter more specifically described, claimed and illustrated in the accompanying drawings, forming a part thereof, in which:

Figure 1 is a perspective view of the improved watering tank,

Figure 2 is a side elevation of the same, and

Figure 3 is a longitudinal sectional view of the same.

Referring to the drawings in detail, wherein similar reference characters designate corresponding parts throughout the several views, the numeral 1 generally indicates the improved watering tank or trough, which includes the inner and outer spaced walls 2 and 3, forming the inner water containing body 4 and the protecting casing 5. The inner water container 4 includes the cylindrical side walls 6, the rear wall 7, and the front wall 8, which is secured to the side walls 6 inward of the ends thereof, for a purpose which will hereinafter more fully appear. The outer protecting casing 5 is spaced from the inner water compartment and includes the outer cylindrical wall 9 having the forward end thereof bent inwardly as at 10 to form a substantially frusto-conical shaped portion, the purpose of which will hereinafter more fully appear, and the rear wall 11. The forward end of the cylindrical side wall 6 of the inner member 4 is secured to the terminal of the outer wall 9 of the protecting casing and thus effectively provides an air-tight compartment which extends around the side and rear walls of the inner compartment for effectively protecting the water contained in the inner compartment from undue cold or heat. The side walls 6 and 3 are held in spaced relation by spacing blocks 12. The rear walls 7 and 11 are also held in spaced relation by spacing blocks 13. The outer casing 5 is provided with a front wall 14, which is secured at its top edge to the outer ends of the side walls 6 and 9 and extends downwardly and inwardly at an incline towards the lower portion of the inner side wall 6 and is slightly spaced from the lower portion thereof so that the walls 14 and 18 are both spaced from the wall 6 by openings 15 so as to allow the water to seep therethrough. The forward end of the device is provided with an upwardly extending wall or ledge 16, which forms the watering trough from which the animals and fowls may drink and serves to retain the water which seeps through the openings 15. The atmospheric pressure acting upon the water in the trough prevents the same from rising beyond a predetermined level.

When it is desired to fill the tank, the same is stood on its rear end and the water is poured onto the front wall 14 and owing to the inclination of the same, the water is directed through the opening 15 and into the inner member.

In practice, hot water is poured into the tank and owing to the dead air space in the inner and outer sections, the water is prevented from cooling rapidly and thus will remain in a warm state for a considerable length of time and thereby eliminate the necessity of providing a lamp for warming the water and preventing the freezing thereof. The arrangement of the walls 14 and 8 also effectively insulates the forward end of the tank from the atmosphere, as the water seeping from the openings 15 and below the wall 14 effectively seals these openings and provides a substantially dead air space between the walls 8 and 14.

Legs 17 and 18 are secured to the front and rear portions of the tank at the lower end thereof so as to prevent the same from accidental displacement and these legs consist of strips of metal secured at the central portion to the tank and having the terminals thereof bent upwardly into engagement with the sides of the tank. A bail 19 is provided so that the tank can be easily carried around and set upon its end when desired and this bail is pivotally secured to ears 20 secured to the forward end of the tank. The rear end of the tank at the upper end thereof is also provided with a handle 21, for placing the tank on its end when it is desired to fill the same.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize that various minor changes in details of construction, proportion and arrangement of parts may be resorted to, when required without sacrificing any of the advantages of my invention as set forth.

What I claim as new is:

A watering trough comprising an inner cylindrical casing, an outer cylindrical casing spaced around said inner casing, a flat rear wall for said inner casing, a flat rear wall for said outer casing, said flat walls being spaced from each other, a flat front wall for said inner casing set inwardly from the front thereof and spaced at its lower edge from the cylindrical wall of the inner casing to provide a water passage, a flat front wall for said outer casing extending downwardly and inclined inwardly from the top thereof so that the lower edge of said inclined wall is adjacent the lower edge of said inner casing front wall and is similarly spaced from the cylindrical wall of the inner casing, and a ledge extending up from the lower side of said inner casing at the front thereof whereby a drinking space is provided between said ledge and said inclined wall.

In testimony whereof I affix my signature in presence of two witnesses.

FRANK TURK.

Witnesses:
TEMPIE M. CRAIG,
L. H. BRUGGEMAN.